(12) United States Patent
Wu et al.

(10) Patent No.: US 12,267,909 B2
(45) Date of Patent: Apr. 1, 2025

(54) USER EQUIPMENT OPERATING AS RELAY VIA A SIDELINK CONNECTION

(71) Applicant: Apple Inc., Cupertino, CA (US)

(72) Inventors: Zhibin Wu, Los Altos, CA (US); Adesh Kumar, San Jose, CA (US); Dawei Zhang, Saratoga, CA (US); Fangli Xu, Beijing (CN); Haijing Hu, Los Gatos, CA (US); Naveen Kumar R. Palle Venkata, San Diego, CA (US); Sethuraman Gurumoorthy, San Ramon, CA (US); Srirang A. Lovlekar, Fremont, CA (US); Sudeep Manithara Vamanan, Nuremberg (DE); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 599 days.

(21) Appl. No.: 17/593,591

(22) PCT Filed: Jul. 24, 2020

(86) PCT No.: PCT/CN2020/104477
§ 371 (c)(1),
(2) Date: Sep. 21, 2021

(87) PCT Pub. No.: WO2022/016517
PCT Pub. Date: Jan. 27, 2022

(65) Prior Publication Data
US 2022/0303749 A1    Sep. 22, 2022

(51) Int. Cl.
*H04W 8/00*    (2009.01)
*H04W 16/28*    (2009.01)
(Continued)

(52) U.S. Cl.
CPC ........... *H04W 8/005* (2013.01); *H04W 16/28* (2013.01); *H04W 24/08* (2013.01); *H04W 24/10* (2013.01); *H04W 88/04* (2013.01); *H04W 92/18* (2013.01)

(58) Field of Classification Search
CPC ..... H04W 8/005; H04W 16/28; H04W 24/08; H04W 24/10; H04W 88/04; H04W 92/18
(Continued)

(56) References Cited

U.S. PATENT DOCUMENTS

| 2016/0044613 | A1 | 2/2016 | Cai et al. |
| 2017/0230941 | A1 | 8/2017 | Agiwal et al. |

(Continued)

FOREIGN PATENT DOCUMENTS

| CN | 106888494 | 6/2017 |
| CN | 110461020 | 11/2019 |

(Continued)

OTHER PUBLICATIONS

Catt, "Overviews on UE-to-Network Relay procedure and Relay UE selection"; 3GPP TSG RAN WG1 Meeting #81; R1-152572; May 29, 2015; 4 sheets.
(Continued)

*Primary Examiner* — Nicholas R Taylor
*Assistant Examiner* — Chong G Kim
(74) *Attorney, Agent, or Firm* — Fay Kaplun & Marcin, LLP

(57) ABSTRACT

A first user equipment (UE) is capable of serving as a relay for a second UE using a sidelink connection. The first UE determines that a predetermined condition is satisfied, the predetermined condition associated with the first UE operating as a relay for a second UE, transmits a discovery message and monitors for a signal from the second UE in response to the discovery message.

20 Claims, 9 Drawing Sheets

UE-to-Network Relay 300

(51) Int. Cl.
*H04W 24/08* (2009.01)
*H04W 24/10* (2009.01)
*H04W 88/04* (2009.01)
*H04W 92/18* (2009.01)

(58) Field of Classification Search
USPC .......................................................... 370/329
See application file for complete search history.

(56) References Cited

U.S. PATENT DOCUMENTS

| | | | |
|---|---|---|---|
| 2018/0098370 A1* | 4/2018 | Bangolae | H04W 88/04 |
| 2018/0352411 A1 | 12/2018 | Ryu et al. | |
| 2019/0222983 A1 | 7/2019 | Adachi | |
| 2019/0349722 A1* | 11/2019 | Lee | H04W 4/16 |
| 2019/0364437 A1 | 11/2019 | Kamei et al. | |
| 2020/0389900 A1 | 12/2020 | Lee et al. | |
| 2021/0067997 A1 | 3/2021 | Wang et al. | |
| 2021/0212051 A1 | 7/2021 | Raghavan et al. | |
| 2022/0303866 A1 | 9/2022 | Zhang | |
| 2022/0338092 A1 | 10/2022 | Wang | |
| 2023/0136426 A1* | 5/2023 | Cheng | H04W 40/24 |
| 2023/0145738 A1 | 5/2023 | Yang | |
| 2023/0180313 A1* | 6/2023 | Freda | H04W 76/27 370/310 |
| 2023/0247513 A1* | 8/2023 | Paladugu | H04W 88/04 370/315 |

FOREIGN PATENT DOCUMENTS

| | | |
|---|---|---|
| CN | 110679190 A | 1/2020 |
| CN | 111417078 A | 7/2020 |
| WO | 2016/183710 | 11/2016 |
| WO | 2020/067682 A1 | 4/2020 |
| WO | 2020/088513 | 5/2020 |

OTHER PUBLICATIONS

Zte, "Report of email discussion [90#25][LTE/ProSe] Relay UE initiation, discovery and selection/re-selection"; 3GPP TSG-RAN WG2 Meeting #91; R2-153764; Aug. 28, 2015; 41 sheets.

Oppo et al.; "Solution for UE-to-Network Relay discovery and selection"; 3GPP SA WG2 Meeting #136AH; S2-2001498; Jan. 17, 2020; 3 sheets.

Qualcomm Incorporated, "UE-to-NW Relay discovery"; 3GPP SA WG2 Meeting #136; S2-1911922; Nov. 22, 2019; 3 sheets.

Zte, "Discussion on relay discovery of bandwidth limited remote UE"; 3GPP TSG-RAN WG2 Meeting #99; R2-1708513; 5 sheets, Date: Aug. 21, 2017.

* cited by examiner

USER EQUIPMENT OPERATING AS RELAY VIA A SIDELINK CONNECTION

BACKGROUND

A user equipment (UE) may be configured with multiple communication links. For example, the UE may receive a signal from a cell of a network over a downlink and may transmit a signal to the cell over an uplink. The UE may also be configured to communicate with a further UE via a sidelink. The term sidelink refers to a communication link that may be utilized for device-to-device (D2D) communication. Thus, the sidelink may facilitate communication between the UE and the further UE without the use of a cell.

The sidelink may be used as a radio relay link. For example, to facilitate communication between the network and the remote UE in a UE-to-Network relay, the network may exchange signals with the relay UE via an uplink/downlink and the relay UE may exchange signals with the remote UE via a sidelink. Similarly, to facilitate communication between a first remote UE and a second remote UE in a UE-to-UE relay, the first remote UE may exchange signals with the relay UE via a first sidelink and the second remote UE may exchange signals with the relay UE via a second sidelink. To establish a sidelink relay, the remote UE may perform a relay selection procedure during which the remote UE scans for available relay UEs and then selects one of the available relay UEs as a relay point between the remote UE and another remote endpoint (e.g., a UE, a cell, etc.).

SUMMARY

Some exemplary embodiments are related to a method performed by a first user equipment (UE). The method includes determining that a predetermined condition is satisfied, the predetermined condition associated with the first UE operating as a relay for a second UE, transmitting a discovery message and monitoring for a signal from the second UE in response to the discovery message.

Other exemplary embodiments are related to a user equipment (UE) having a transceiver and a processor. The transceiver is configured to communicate with a network. The processor is configured to perform operations including determining that a predetermined condition is satisfied, the predetermined condition associated with the UE operating as a relay for a second UE, transmitting a discovery message and monitoring for a signal from the second UE in response to the discovery message.

Still further exemplary embodiments are related to an integrated circuit. The integrated circuit includes circuitry configured to determine that a predetermined condition is satisfied, the predetermined condition associated with a first UE operating as a relay for a second UE, circuitry configured to transmit a discovery message and circuitry configured to monitor for a signal from the second UE in response to the discovery message.

DETAILED DESCRIPTION

Figure 1:
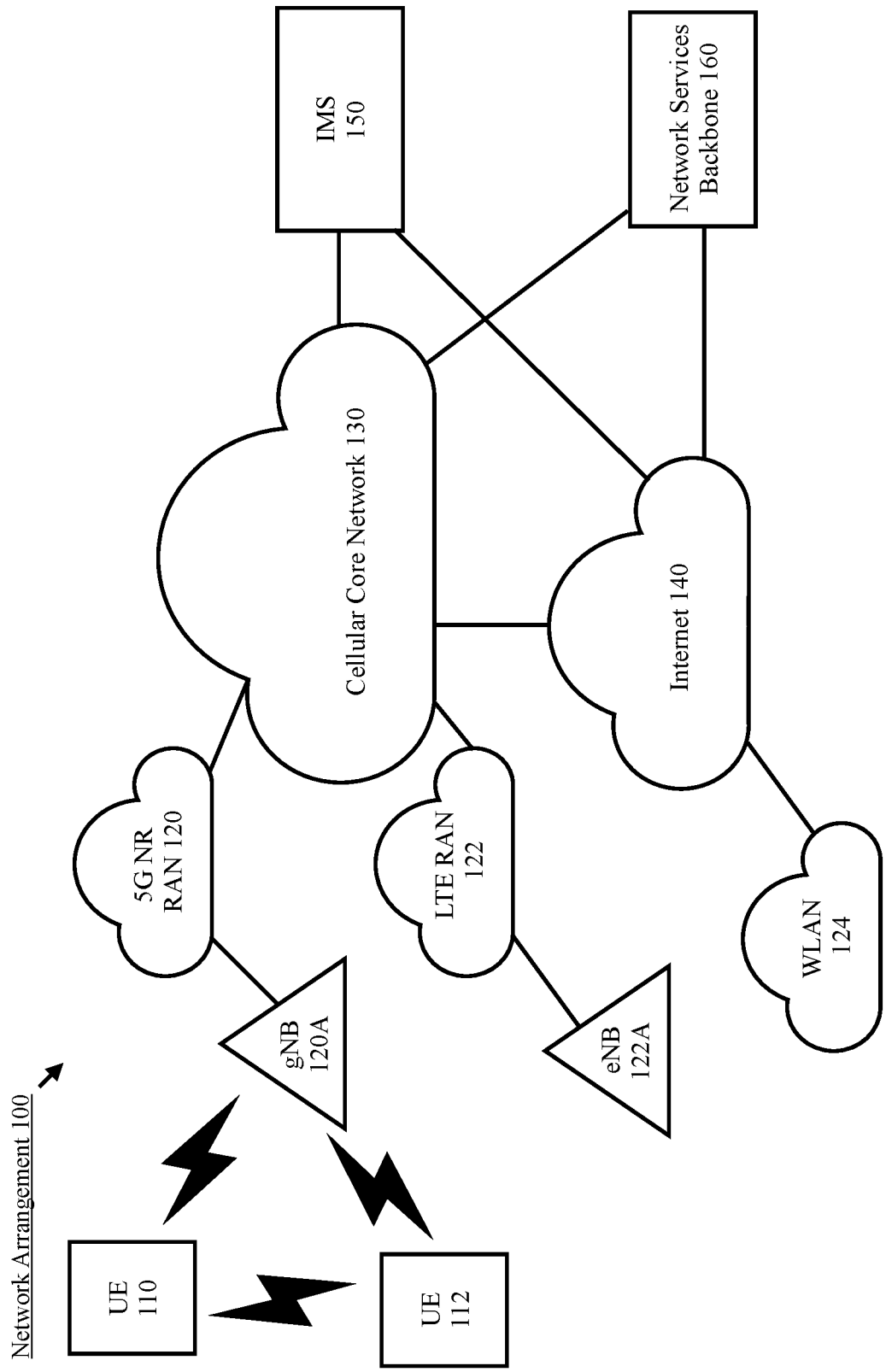
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to implementing a relay selection procedure for establishing a sidelink relay. The exemplary embodiments provide the network, a remote user equipment (UE) and a relay UE with mechanisms to handle situations related to relay discovery and relay selection.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to a sidelink. The term "sidelink" generally refers to a communication link between the UE and a further UE. The sidelink provides direct device-to-device (D2D) communication where information and/or data exchanged between the UE and the further UE via the sidelink does not go through a cell. In some configurations, a single sidelink provides bidirectional communication between the UE and the further UE. In other configurations, a single sidelink provides unidirectional communication between the UE and the further UE. The exemplary embodiments may apply to either a bidirectional or unidirectional sidelink.

Sidelink communications are supported by Long Term Evolution (LTE) and fifth generation (5G) new radio (NR) standards. In some configurations, the network may provide information to the UE that indicates how a sidelink is to be established, maintained and/or utilized. Thus, while the information and/or data exchanged over the sidelink does not go through a cell, the UE and the network may exchange information associated with the sidelink. In other configurations, a sidelink is not under the control of the network. In either configuration, the UE and the further UE may still perform synchronization procedures, discovery procedures and exchange control information corresponding to the sidelink.

The sidelink may be used as a radio relay link. For example, a UE-to-Network relay may include a remote UE, a relay UE and a cell. The term "remote UE" may refer to a UE that is configured as a remote end of a relay. The term "relay UE" may refer to a UE that is configured to serve as a relay point between two remote endpoints of the relay. In this example, the other remote endpoint is the cell. To facilitate communication between the remote UE and the network in a UE-to-Network relay, the cell may exchange signals with the relay UE via an uplink and/or downlink and the relay UE may exchange signals with the remote UE via a sidelink. Thus, the remote UE may access network services via the relay UE.

A UE-to-UE relay may include a first remote UE, a relay UE and a second remote UE. To facilitate communication between the first remote UE and the second remote UE, the first remote UE may exchange signals with the relay UE via a first sidelink and the second remote UE may exchange signals with the relay UE via a second sidelink. Thus, in a UE-to-UE relay the first remote UE may communicate with the second remote UE via the relay UE.

How or for what purpose the sidelink relay may be utilized is beyond the scope of the exemplary embodiments. Instead, the exemplary embodiments are directed towards implementing a relay selection procedure. Throughout this description, to differentiate between UEs, the terms "remote UE" and "relay UE" may also be used to characterize UEs that intend to serve in these roles but have not yet completed the steps to establish a sidelink relay.

From the perspective of a remote UE, the relay selection procedure may include operations such as, but not limited to, scanning for available relay UEs, collecting measurement data and selecting one of the available relay UEs to use as a relay point. From the perspective of a relay UE, the relay selection procedure may include operations such as, but not limited to, transmitting a discovery message indicating the availability of the relay UE to serve as a relay point for a remote UE. However, reference to the term "relay selection procedure" is merely provided for illustrative purposes, the exemplary embodiments may apply to any appropriate scenario in which a UE intends to serve as a relay UE and/or a remote UE intends to utilize a radio relay to communicate with a further remote endpoint (e.g., a further remote UE, a cell, etc.).

The exemplary embodiments provide the network, a remote UE and a relay UE with mechanisms to handle situations related to relay discovery and rely selection. The exemplary techniques described herein may be used in conjunction with currently implemented techniques related to relay discovery and selection, future implementations of techniques related to relay discovery and selection and independently from other techniques related to relay discovery and selection.

FIG. 1 shows an exemplary network arrangement 100 according to various exemplary embodiments. The exemplary network arrangement 100 includes UEs 110, 112. Those skilled in the art will understand that the UEs 110, 112 may be any type of electronic component that is configured to communicate via a network, e.g., a component of a connected car, a mobile phone, a tablet computer, a smartphone, a phablet, an embedded device, a wearable, an Internet of Things (IoT) device, etc. An actual network arrangement may include any number of UEs being used by any number of users. Thus, the example of two UEs 110, 112 is merely provided for illustrative purposes.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. These types of networks support vehicle-to-everything (V2X) and/or sidelink communication. However, the UE 110 may also communicate with other types of networks and the UE 110 may also communicate with networks over a wired connection. Therefore, the UEs 110, 112 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN via the gNB 120A. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to a single gNB 120A is merely for illustrative purposes. The exemplary embodiments may apply to any appropriate number of gNBs. The UEs 110, 112 may also connect to the LTE-RAN 122 via the eNB 122A.

Those skilled in the art will understand that any association procedure may be performed for the UEs 110, 112 to connect to the 5G NR-RAN 120 and the LTE-RAN 122. For example, as discussed above, the 5G NR-RAN 120 and the LTE-RAN 122 may be associated with a particular cellular provider where the UEs 110, 112 and/or the user thereof has a contract and credential information (e.g., stored on a SIM card). Upon detecting the presence of the 5G NR-RAN 120, the UEs 110, 112 may transmit the corresponding credential information to associate with the 5G NR-RAN 120. More specifically, the UEs 110, 112 may associate with a specific base station (e.g., the gNB 120A of the 5G NR-RAN 120, the eNB 122A of the LTE-RAN 122).

The UEs 110, 112 may also communicate with one another directly using a sidelink. The sidelink is a direct D2D communication link. Thus, the information and/or data transmitted directly to the other endpoint (e.g., the UE 110 or the UE 112) does not go through a cell (e.g., gNB 120A, eNB 122A). In some embodiments the UEs 110, 112 may receive information from a cell regarding how the sidelink is to be established, maintained and/or utilized. Thus, a network (e.g., the 5G NR-RAN 120, LTE-RAN 122) may control the sidelink. In other embodiments, the UEs 110, 112 may control the sidelink. Regardless of how the sidelink is controlled, the UEs 110, 112 may maintain a downlink/uplink to a currently camped cell (e.g., gNB 120A, eNB 122A) and a sidelink to the other UE simultaneously.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
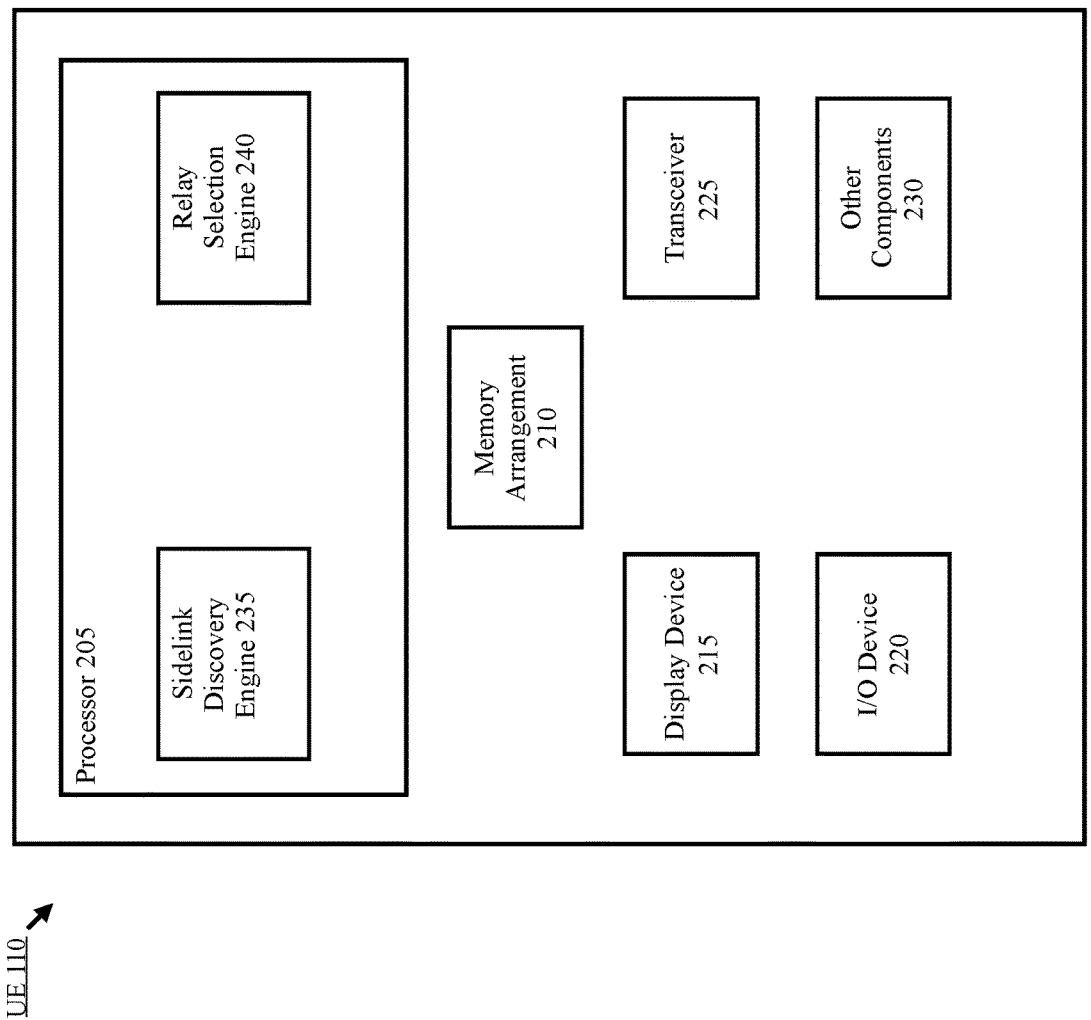
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 235 may include, for example, an audio input device, an audio output device, a power supply, a data acquisition device, ports to electrically connect the UE 110 to other electronic devices, etc. The UE 110 illustrated in FIG. 2 may also represent the UE 112.

The processor 205 may be configured to execute a plurality of engines of the UE 110. For example, the engines may include a sidelink discovery engine 235 and a relay selection engine 240. The sidelink discovery engine 235 may perform operations relate to advertising the availability of the UE 110 to serve as a relay UE. The sidelink discovery engine 235 may also perform operation related to detecting available relate UEs. The relay selection engine 240 may perform operations related to selecting a relay UE as a relay point.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the UE 112, the 5G NR-RAN 120, the LTE-RAN 122, WLAN 122, etc. Accordingly, the transceiver 225 may operate on a variety of different frequencies or channels (e.g., set of consecutive frequencies).

As mentioned above, a sidelink may be used as a radio relay link. The exemplary embodiments provide the network, a remote UE and a relay UE with mechanisms to handle situations related to relay discovery and rely selection. These procedures may be used to establish a UE-to-Network relay or a UE-to-UE relay. Examples of these types of sidelink relays are provided below in FIGS. 3-4.

Figure 3:
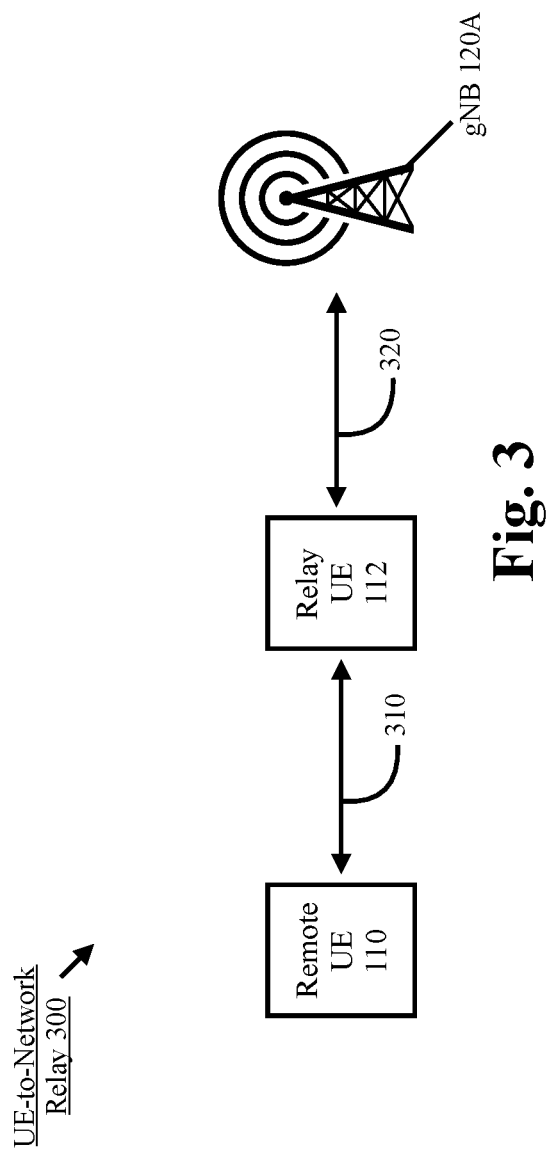
FIG. 3 shows an example of a UE-to-Network relay according to various exemplary embodiments.

FIG. 3 shows an example of a UE-to-Network relay 300 according to various exemplary embodiments. FIG. 3 will be described with regard to the network arrangement 100 of FIG. 1 and the UE 110 of FIG. 2.

The UE-to-network relay 300 includes the remote UE 110, the relay UE 112 and the gNB 120A of the 5G NR RAN 120. The remote UE 110 may exchange signals with the relay UE 112 via the sidelink 310. In this example, the sidelink 310 may represent a PC5 interface. However, the exemplary embodiments are not limited to the PC5 interface and any appropriate communication interface may be used between the remote UE 110 and the relay UE 112. The relay UE 112 may exchange signals with the 5G NR RAN 120 via the gNB 120A. In this example, the connection 320 between the relay UE 112 and the 5G NR RAN 120 may represent a Uu interface. However, the exemplary embodiments are not limited to the Uu interface and any appropriate communication interface may be used between the relay UE 112 and the 5G NR RAN 120.

The remote UE 110 may access network services from the 5G NR RAN 120 via the UE-to-Network relay 300. For example, the remote UE 110 may transmit information and/or data intended for the 5G NR RAN 120 to the relay UE 112 via the sidelink 310. The relay UE 112 may then transmit the information and/or data intended for the 5G NR RAN 120 to the 5G NR RAN 120 via the connection 320. Similarly, the 5G NR RAN 120 may transmit information and/or data intended for the remote UE 110 to the relay UE 112 via the connection 320. The relay UE 112 may then transmit the information and/or data intended for the remote UE 110 to the remote UE 110 via the sidelink 310. Thus, the remote UE 110 may be accessible and controllable by the gNB 120A via the UE-to-Network relay 300.

Figure 4:
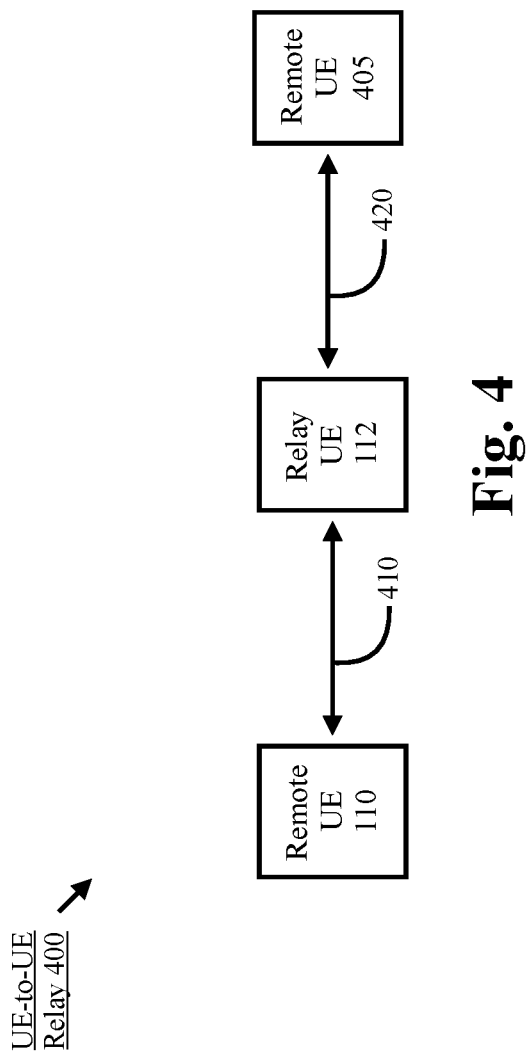
FIG. 4 shows an example of a UE-to-UE relate according to various exemplary embodiments.

FIG. 4 shows an example of a UE-to-UE relay 400 according to various exemplary embodiments. FIG. 4 will be described with regard to the network arrangement 100 of FIG. 1 and the UE 110 of FIG. 2.

The UE-to-UE relay 400 includes the remote UE 110, the relay UE 112 and a remote UE 405. The remote UE 110 may exchange signals with the relay UE 112 via the sidelink 410 and the remote UE 405 may exchange signals with the relay UE 112 via the sidelink 420. In this example, the sidelinks 410, 420 may each represent a PC5 interface. However, the exemplary embodiments are not limited to the PC5 interface and any appropriate communication interface may be used between the remote UEs 110, 405 and the relay UE 112. Unlike, the UE-to-Network relay 300, the UE-to-UE relay 400 does not include an interface with the 5G NR RAN 120.

The remote UE 110 may communicate with the remote UE 405 via the UE-to-UE relay 400. For example, the remote UE 110 may transmit information and/or data intended for the remote UE 405 to the relay UE 112 via the sidelink 410. The relay UE 112 may then transmit the information and/or data intended for the remote UE 405 to the remote UE 405 via the sidelink 420. Similarly, the remote UE 405 may transmit information and/or data intended for the remote UE 110 to the relay UE 112 via the sidelink 420. The relay UE 112 may then transmit the information and/or data intended for the remote UE 110 to the remote UE 110 via the sidelink 410.

Figure 5:
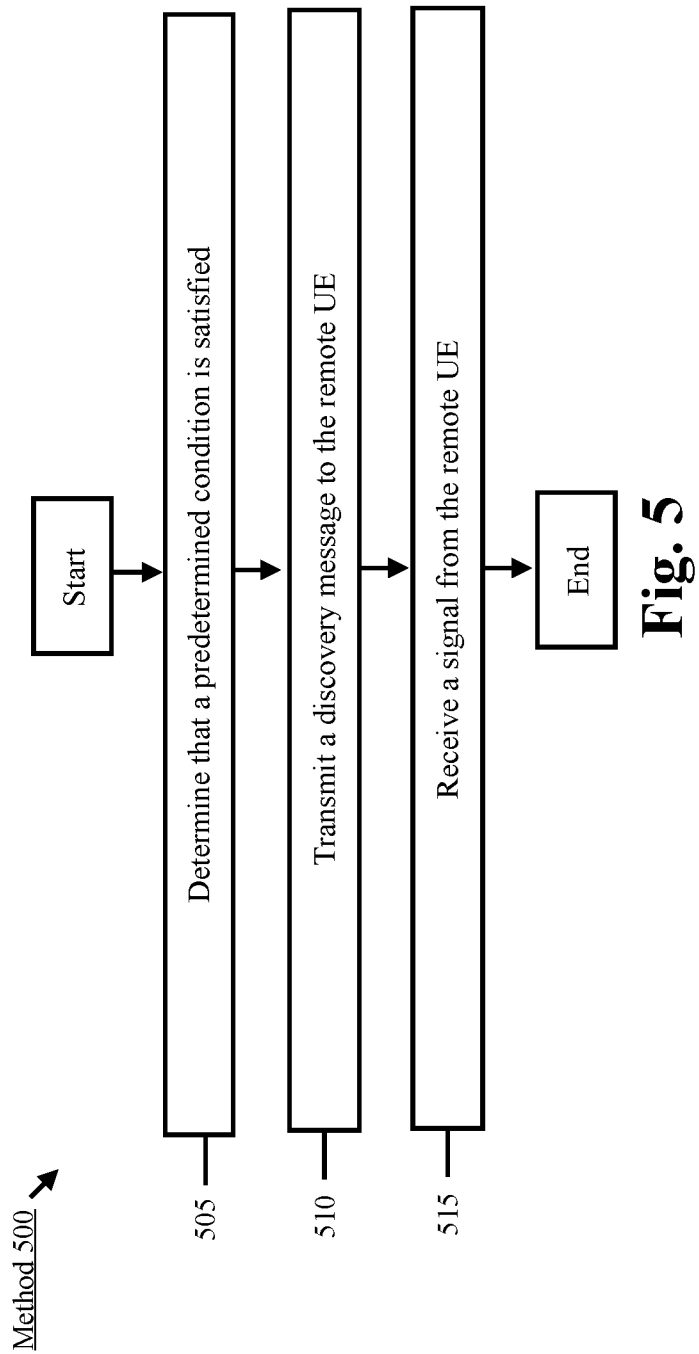
FIG. 5 shows a method for a relay selection procedure from the perspective of a relay UE according to various exemplary embodiments.

FIG. 5 shows a method 500 for a relay selection procedure from the perspective of a relay UE according to various exemplary embodiments. The method 500 is described with regard to the network arrangement 100 of FIG. 1 and the UE 110 of FIG. 2.

As indicated above, the relay selection procedure may be used to establish a sidelink relay between a remote UE and a further remote endpoint (e.g. a UE-to-network relay, UE-to-UE relay, etc.). The method 500 will be described with regard to the UE-to-Network relay 300. However, those skilled in the art will understand that the exemplary concepts described herein are also applicable to a UE-to-UE relay.

Initially, consider a scenario in which the relay UE 112 is camped on the gNB 120A of the 5G NR RAN 120. The connection 320 has already been established, however, the sidelink 310 has not yet been established.

In 505, the relay UE 112 determines that a predetermined condition is satisfied. The predetermined condition may relate to the relay UE 112 being capable of adequately serving as a relay point for a remote UE. The predetermined condition may be based on any of a variety of different factors. Specific examples of some exemplary factors are provided below.

In some embodiments, the predetermined condition may include one or more thresholds related to the connection between the relay UE 112 and the 5G NR RAN 120 (e.g., a Uu link, the connection 320 of FIG. 3). The thresholds may be based on radio resource management (RRM) measurements related to cell quality (e.g., reference signal received power (RSRP), reference signal receive quality (RSRQ)) or any other appropriate parameter. In some embodiments, the relay UE 112 may be preconfigured with one or more thresholds. In other embodiments, the relay UE 112 may be configured with the one or more thresholds via a system information block (SIB), radio resource control (RRC) signaling or any other appropriate network source.

In one aspect, a threshold may be implemented to ensure that the quality and/or strength of the communication link between the relay UE 112 and the 5G NR RAN 120 is capable of adequately supporting the traffic between the remote UE 110 and the 5G NR RAN 120. In another aspect, the one or more thresholds may be implemented to control the location in which relay UEs may operate relative to the currently camped cell and/or the cell boundary. To provide an example, it may be beneficial to have relay UEs that operate closer to the cell boundary to provide network coverage for remote UEs that that are outside of or at the edge of the cell boundary. To provide another example, the network may want to ensure that sidelink traffic does not cause interference or congestion at certain locations within the coverage area.

Figure 6:
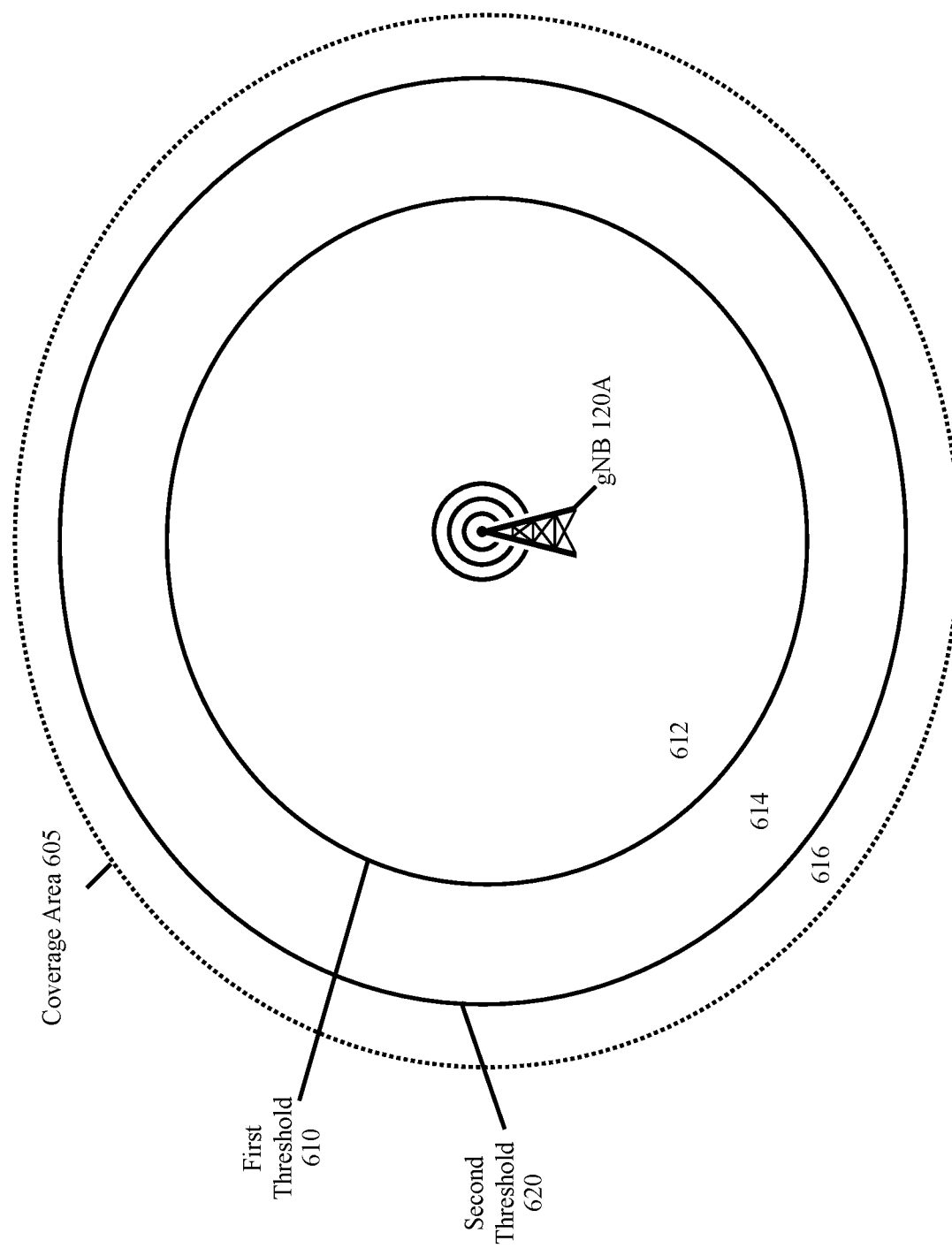
FIG. 6 illustrates an example of using multiple thresholds to control the location in which relay UEs may operate relative to a currently camped cell.

FIG. 6 illustrates an example of using multiple thresholds to control the location in which relay UEs may operate relative to a currently camped cell. FIG. 6 shows the gNB 120A and its corresponding coverage area 605. A first threshold 610 may be implemented to ensure that relay UEs do not operate within a first portion 612 of the coverage area 605. If the relay UE 112 identifies that the measurement values are higher than the first threshold 610, this may indicate that the relay UE 112 is located within the first portion 612 of the coverage area 605.

A second threshold 620 may be implemented to ensure that relay UEs do not operate within a second portion 616 of the coverage area 605. When operating too close to the edge of the coverage area 605 the connection between the relay UE 112 and the gNB 120A may not be robust enough to adequately support the traffic for a remote UE. If the relay UE 112 identifies that the measurement values are lower than the second threshold 620, this may indicate that the relay UE 112 is located within the second portion 616 of the coverage area 605.

The first threshold 610 and the second threshold 620 may be used to keep relay UEs located within a third portion 614 of the coverage area 605. If the relay UE 112 identifies that the measurement values are higher than the second threshold 620 and lower than the first threshold 610, this may indicate that the relay UE 112 is located within the third portion 614 of the coverage area 605.

The first threshold and the second threshold may be configured by the gNB 120A via RRC signaling or any other appropriate type of signaling. However, reference to two thresholds is merely for illustrative purposes, the exemplary embodiments may apply to the use of zero or more thresholds. For example, if only one threshold is configured by the gNB 120A, the UE 110 may compare measurement data to a single threshold.

The example described above demonstrates how two thresholds may be utilized to control the location of relay UEs relative to the cell and its corresponding cell boundary. However, reference to two thresholds is merely provided for illustrative purposes, the exemplary embodiments may apply to any appropriate number of thresholds.

5G NR cells operating in frequency range 2 (FR2) may utilize beamforming which is an antenna technique used to transmit a directional signal (e.g., a beam). Beam direction may also be utilized to control the location in which relay UEs may operate relative to a currently camped cell. For instance, in multi-beam operation, the gNB 120A may want to avoid beam directions used by backhaul links to be shared with sidelink relay traffic. Thus, the gNB 120A may be configured to further restrict the location in which the relay UE 112 is allowed to operate as a relay point.

Figure 7:
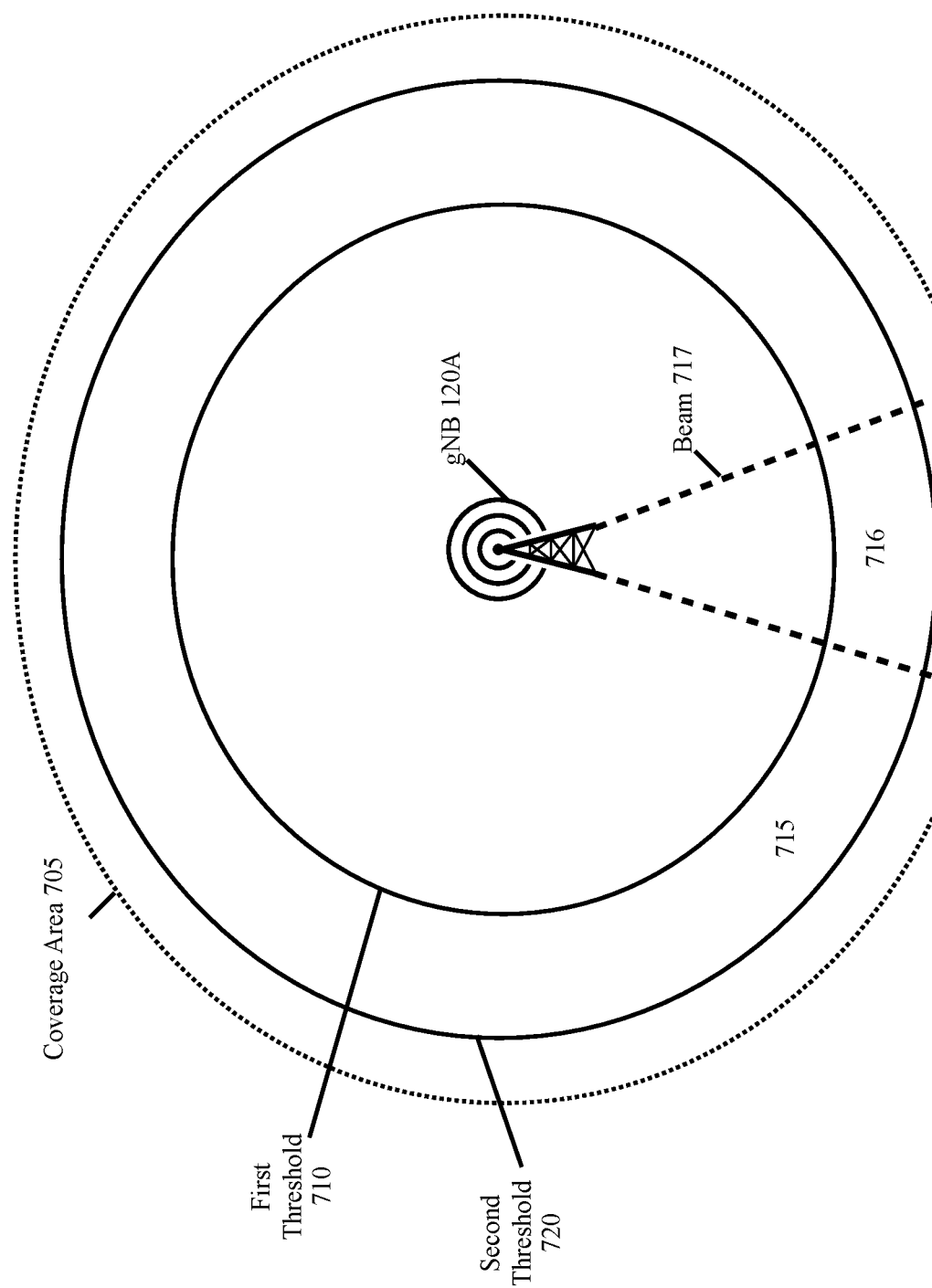
FIG. 7 illustrates an example of using multiple thresholds and beam direction to control the location in which relay UEs may operate relative to a currently camped cell.

FIG. 7 illustrates an example of using multiple thresholds and beam direction to control the location in which relay UEs may operate relative to a currently camped cell. FIG. 7 shows the gNB 120A and its corresponding coverage area 705.

Like the example shown in FIG. 6, the example shown in FIG. 7 includes a first threshold 710 and the second threshold 720 that may be used to keep relay UEs located within portion 715 of the coverage area 705.

In addition to the thresholds, a synchronization signal block (SSB) index may be used to further restrict the relay UE 112 to portion 716 of the coverage area 705. For example, each beam may correspond to a different SSB index value (e.g., 0, 1, 2, 3, 4, etc.). The SSB index value may indicate a beam direction relative to the gNB 120A and thus, be used to control the location in which relay UEs may operate relative to a currently camped cell. In this example, the beam 717 may represent the coverage area of one or more beams that include SSB index values corresponding to portion 716 of the coverage area 705.

In some embodiments, the one or more thresholds may be compared to a single quality value that is based on the linear average of one or more beams. In other embodiments, a single beam-level threshold may be used. For the single beam-level threshold, the relay UE 112 may also use a minimum and/or maximum threshold related to the number of beams that satisfy the single beam-level threshold.

Returning to the method 500, the predetermined condition may also include factors such as, but not limited to, whether the currently camped cell is barred in SIB1, whether the RAN supports the use of a sidelink relay, whether the currently camped cell supports sidelink operation, whether the relay UE 112 has a power constraint, etc. When the relay UE 112 is already active as a relay point, the predetermined condition may also consider whether the relay UE 112 still has the capacity and/or bandwidth to handle an additional remote UE. In some embodiments, these factors may be determined from the access stratum (AS) layer of the protocol stack.

The relay UE 112 may also consider whether the relay UE 112 is currently camped on a roaming PLMN. If the relay UE 112 is roaming, the relay UE 112 may not want to serve as a relay point to avoid roaming charges. The relay UE 112 may also consider whether it is in a limited service state. When in the limited service state, the relay UE 112 may only provide limited functions for remote UEs (e.g., system information forwarding, etc.). In some embodiments, these factors may be determined from the upper layers of the protocol stack.

During operation, the AS layer and the upper layers may interact with one another in a variety of different ways. For example, in one embodiment, the AS layer may determine whether one or more factors are satisfied. The AS layer may then send an indication that these factors are satisfied to the upper layers along with other parameters that may be broadcast to remote UEs (e.g., cell quality, system information, etc.). In another embodiments, the upper layers may solicit information from the AS layer on-demand and then determine which factors are satisfied.

In 510, the relay UE 112 transmits a discovery message to the remote UE 110. For example, in response to determining that the relay UE 112 is capable of adequately serving as a relay point for a remote UE, the relay UE 112 may broadcast a discovery message indicating the availability of the relay UE 112. The relay UE 112 may broadcast this message one or more times. In some embodiments, the message may be broadcast periodically in accordance with any appropriate schedule or cycle.

The discovery message may be an upper layer message and include a proximity services (ProSe) relay UE ID or any other appropriate upper layer address. The discovery message may also include an indication of the type of relay (e.g., public safety (PS), commercial, V2X, etc.) and information regarding the mobility of the relay UE 112 (e.g., speed, direction, etc.). The discovery message may also indicate whether the relay is capable of being a layer 2 (L2) based relay which uses AS mechanisms or layer 3 (L3) based relay which uses internet protocol (IP) routing mechanisms.

The discovery message may further include AS layer information such as an indication of the quality of the connection between the relay UE 112 and the currently camped cell (e.g., the Uu link), system information (e.g., PLMN list, etc.) and sidelink capability information. The sidelink capability information may indicate the supported sidelink frequency bands (other than the carrier over which the discovery message is transmitted) and whether hybrid automatic repeat request (HARQ) feedback is supported.

The discovery message may also include additional information that may be used by the remote UE for relay selection. For example, the discovery message may indicate a sidelink bandwidth allocation for relay traffic and self-traffic. In another example, the discovery message may indicate a level of service that may be provided such as the bandwidth the relay UE 112 is offering the remote UE, quality of service (QoS) on the sidelink and/or the relay, network slices that the remote UE can access through the relay UE 112, whether emergency calls may be established on the currently camped cell and whether the relay UE 112 is in limited service state.

In some embodiments, the discovery message may be part of a discovery announce and monitor scheme. This type of scheme may include the broadcast of the discovery message by the relay UE 112 and a response from one or more remote UEs acknowledging receipt of the discovery message. In other embodiments, the discovery message may be in response to a discovery query. This type of scheme may include a broadcast of a discovery query by a remote UE indicating that the remote UE is searching for a sidelink relay. The contents of the discovery query may include parameters such as, but not limited to, a relay type, a ProSe relay UE ID, the UE coverage status (e.g., out of coverage or in-coverage), a cell ID, or any other appropriate parameter. In response, the relay UE 112 may transmit the discovery message to the remote UE.

In 515, the relay UE 112 receives a signal from the remote UE. For example, the signal may be a discovery response to a discovery message or an indication that the remote UE 110 has selected the relay UE 112 to serve as a relay point. In another example, the signal may include information and/or data that is to be forwarded to the other remote endpoint (e.g., remote UE, 5G NR RAN, etc.). Subsequently, the method 500 ends.

Figure 8:
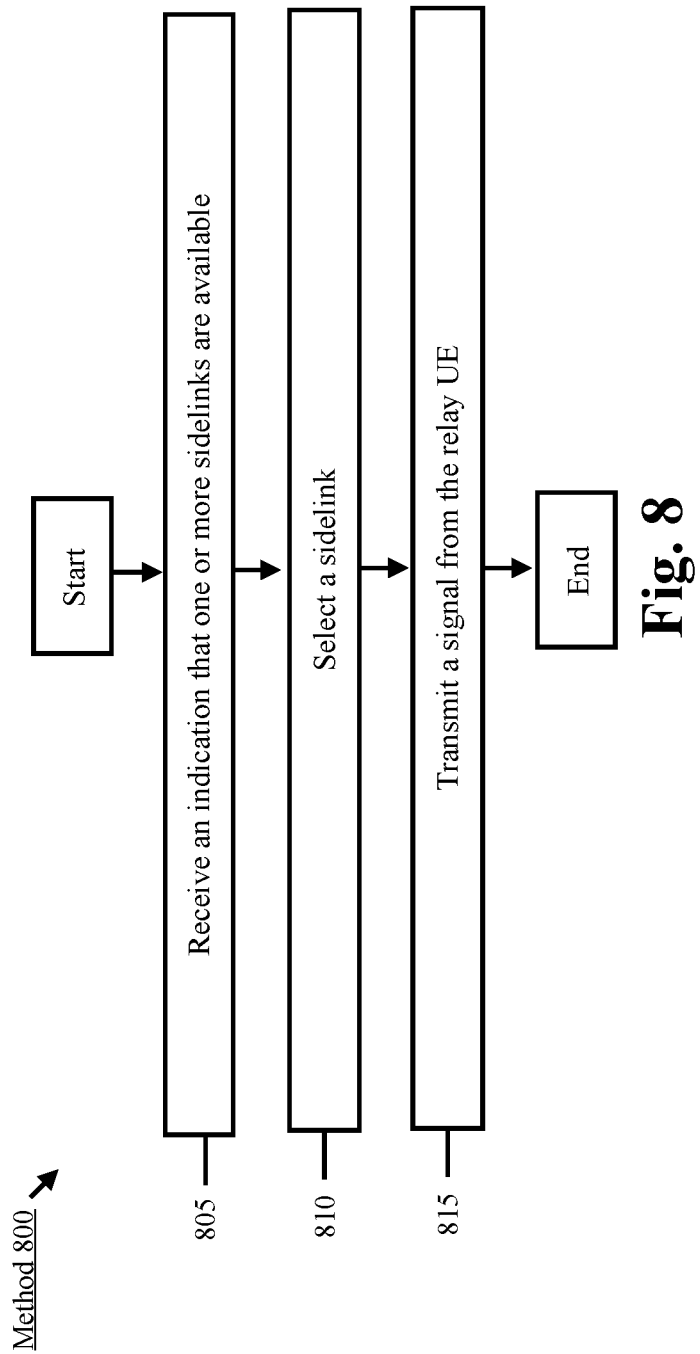
FIG. 8 shows a method for a relay selection procedure from the perspective of a remote UE according to various exemplary embodiments.

FIG. 8 shows a method 800 for a relay selection procedure from the perspective of a remote UE according to various exemplary embodiments. The method 800 is described with regard to the network arrangement 100 of FIG. 1 and the UE 110 of FIG. 2.

As indicated above, the relay selection procedure may be used to establish a sidelink relay between a remote UE and a further remote endpoint (e.g. a UE-to-network relay, UE-to-UE relay, etc.). The method 800 will be described with regard to the UE-to-Network relay 300. However, those skilled in the art will understand that the exemplary concepts described herein are also applicable to a UE-to-UE relay.

In 805, the remote UE 110 receives an indication that one or more sidelinks are available. For example, the remote UE 110 may tune the transceiver 225 to scan various frequency bands to search for a discovery message. In another example, the remote UE 110 may have previously transmitted a discovery query and the indication may be received in response to the discovery query.

In 810, the remote UE 110 selects a sidelink. The selection may be performed on any appropriate basis. For example, the remote UE 110 may collect measurement data corresponding to the available sidelinks. If there is a single sidelink available, the remote UE 110 may select the sidelink if the measurement data indicates that the sidelink is of adequate quality. The minimum adequate quality of the sidelink may be preconfigured in the UE 110 in the form a threshold. This threshold may be configured by the RAN when the UE 110 is in coverage. If multiple sidelinks are available and/or of adequate quality, the remote UE 110 may select one of the available sidelinks based on the measurement data.

The remote UE 110 may also consider measurement data corresponding to the Uu link quality of the relay UE. However, in some scenarios, the remote UE 110 may not be aware of the current Uu link quality for a relay UE. In this type of scenario, there is a risk of selecting a first relay UE that has an inadequate Uu. An example of this type of scenario is provide below in FIG. 9.

Figure 9:
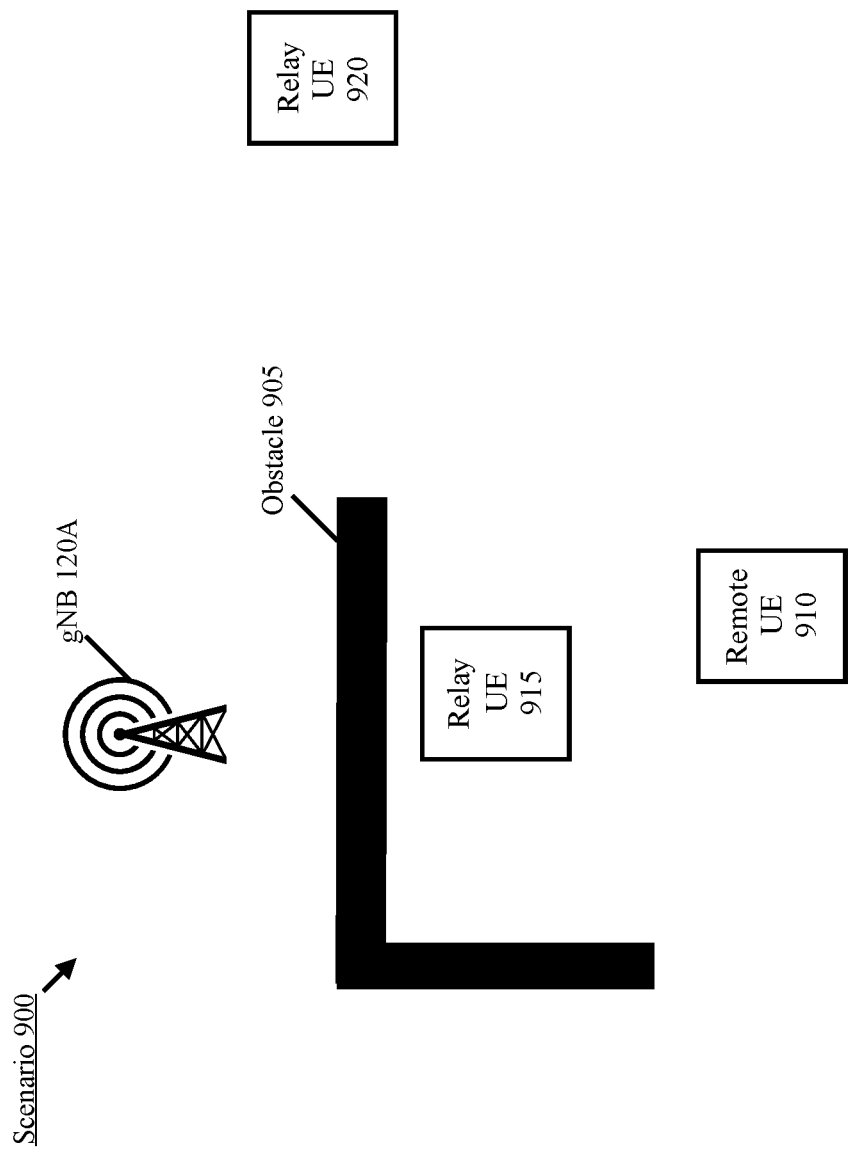
FIG. 9 shows an exemplary scenario for relay selection according to various exemplary embodiments.

FIG. 9 shows an exemplary scenario 900 for relay selection according to various exemplary embodiments. The exemplary scenario 900 includes the gNB 120A, an obstacle 905, a remote UE 910, a first relay UE 915 and a second relay UE 920.

In the scenario 900, from the perspective of the remote UE 910, the measurement data for a sidelink corresponding to the first relay UE 915 may be better than the measurement data for the sidelink corresponding to the second relay UE 920. However, due to the obstacle 905 (e.g., a wall, a building, etc.), the Uu link corresponding to the first relay UE 915 is inadequate. Since the second relay UE 920 has a clear line of sight, the Uu link corresponding to the second relay UE 920 is adequate for the sidelink relay. If the remote UE 910 is not aware of the quality of the Uu links, the remote UE 910 may select the first relay UE 915 despite the first relay UE 915 having an inadequate Uu link. Thus, in addition to or instead of the measurement data, a remote UE may select a sidelink based on the contents of the discovery message and/or any other appropriate source of information.

In some embodiments, the remote UE 910 may utilize ultra-wideband (UWB) capabilities to recognize the spatial surroundings of the remote UE 910. The UWB information may be used to influence relay selection. For example, the remote UE 910 may recognize the obstacle 905 and determine that relay UEs in that direction may have an obstructed line of sight to the gNB 120A. Thus, the remote UE 910 may not consider the first relay UE 915 or any other relay UEs in that beam direction during the relay selection procedure.

Returning to the method 800, in some embodiments, the remote UE 110 may select or eliminate candidate sidelinks based on the contents included in the discovery messages. For example, in the context of V2X, the remote UE 110 may not consider a relay UE if mobility information indicates that the relay UE is moving in the opposite direction of the remote UE 110. In another embodiment, the remote UE 110 may prefer a relay that supports a sidelink in both frequency range 1 (FR1) and FR2. In another example, the remote UE 110 may have a preference for an L2-based relate, an L3-based relay or a relay UE that supports both L2 and L3 forwarding mechanisms. The discovery message may indicate whether L2, L3 or both are supported and thus, the remote UE 110 may select or reselect a relay based on this indication. Other examples of the types of contents that may be included in the discovery message and may be used by the remote UE 110 during relay selection are described above with regard to the method 500 of FIG. 5.

There may be several different ways for the remote UE 110 to identify a discovery message. In some embodiments, the upper layer defines a L2 address which may be used for sidelink relay discovery only. Any message broadcast to this address may be detected by the AS layer. If in response to a discovery query, the discovery message may be sent to a unicast L2 address that is equal to the L2 address in the discovery query. Since this address is only used for relay discovery it may be distinguished from other sidelink traffic. In other embodiments, a service data unit (SDU) type included in a packet data convergence protocol (PDCP) header of the discovery message may be used to identify a relay discovery message. In other embodiments, a dedicated sidelink discovery resource pool may be used for discovery messages. In further embodiments, a dedicated sidelink logical channel ID may be used for sidelink discovery.

From a protocol stack perspective, processing a received discovery message may include inter-layer interaction. In some embodiments, the discovery message is transparent to the AS layer of the remote UE 110 and it cannot be distinguished from other sidelink broadcast. In this type of scenario, the remote UE 110 may tag each received sidelink broadcast with measurement data (e.g., RSRP, RSRQ, etc.) and send it to the upper layers. Next, the upper layer may determine that the sidelink broadcast is a discovery message and then record an indication of the corresponding relay ID and the measurement data. For discovered relay UEs, a PC5 metric based on the measurement data may be generated and used for the relay selection procedure.

In other embodiments, the discovery message may be identified by the AS layer. For example, the AS layer may identify the SDU type included in a packet data convergence protocol (PDCP) header of the discovery message. The remote UE 110 may then conduct layer 3 (L3) filtering of RSRP measurements of discovery messages sent by a relay UE and then sort them based on a L2 address. The remote UE 110 may determine whether a threshold value is satisfied and then remove all ineligible sidelinks. The upper layer may have a whitelist of L2 addresses or other relevant filters for AS layer relay selection so the AS layer may further eliminate inappropriate candidate sidelinks. Alternatively, all candidate sidelinks that satisfy the threshold value may be passed to the upper layer. Subsequently, the remote UE 110 may select a sidelink using any of the exemplary techniques described herein.

In 815, the remote UE 110 transmits a signal to the selected relay UE. For example, the signal may be a response to a discovery message or an indication that the remote UE 110 has selected the relay UE 112 to serve as a relay point. In another example, the signal may include information and/or data that is to be forwarded to the other remote endpoint (e.g., remote UE, 5G NR RAN, etc.). Subsequently, the method 800 ends.

The examples of the method 500 and method 800 are described with regard to a UE-to-Network relay. However, the exemplary embodiments are not limited to a UE-to-Network relay and may also apply to a UE-to-UE relay. The difference in these scenarios is that the UE-to-UE relay is not concerned with cellular aspects (e.g., Uu links) during the relay selection procedure.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
   at a first user equipment (UE):
   determining that a predetermined condition is satisfied, the predetermined condition associated with the first UE operating as a layer 2 (L2) UE-to-network relay for a second UE and comprising at least one or more access stratum (AS) layer based conditions, wherein the L2 UE-to-network relay comprises a Uu interface between the first UE and a base station and a PC5 interface between the first UE and the second UE;
transmitting a sidelink discovery message, in response to determining that the predetermined condition is satisfied; and
monitoring for a signal from the second UE in response to the discovery message.

2. The method of claim 1, further comprising:
collecting measurement data corresponding to a connection between the first UE and a currently camped cell, and
wherein determining that the predetermined condition is satisfied includes determining that the measurement data is above a first threshold and below a second threshold and wherein the first threshold and the second threshold is configured by the currently camped cell.

3. The method of claim 2, wherein the measurement data is a single quality value based on measurement data corresponding to multiple beams.

4. The method of claim 1, wherein the discovery message is transmitted in response to a query received from the second UE.

5. The method of claim 1, further comprising:
collecting measurement data corresponding to multiple beams, and
wherein determining that the predetermined condition is satisfied includes determining whether measurement data corresponding to each beam in a subset of the multiple beams satisfies a threshold value.

6. The method of claim 1, wherein the predetermined condition is based on a synchronization signal block (SSB) index value.

7. The method of claim 1, wherein the discovery message includes at least one of a proximity services (ProSe) relay UE ID, relay type information, mobility information, a layer 2 (L2) relay indication and a layer 3 (L3) relay indication.

8. The method of claim 1, wherein the discovery message includes at least one of an indication of a quality of a connection between the first UE and a currently camped cell, system information, supported sidelink frequency bands and an indication that hybrid automatic repeat request (HARQ) feedback is supported.

9. The method of claim 1, wherein the discovery message includes at least one of i) a layer 2 (L2) address specific for discovery services and ii) a service data unit (SDU) type in a packet data convergence protocol (PDCP) header.

10. A user equipment (UE), comprising:
a transceiver configured to communicate with a network; and
a processor configured to perform operations, the operations comprising:
determining that a predetermined condition is satisfied, the predetermined condition associated with the UE operating as a layer 2 (L2) UE-to-Network relay for a second UE and comprising at least one or more access stratum (AS) layer based conditions, wherein the L2 UE-to-network relay comprises a Uu interface between the first UE and a base station and a PC5 interface between the first UE and the second UE;
transmitting a sidelink discovery message, in response to determining that the predetermined condition is satisfied; and
monitoring for a signal from the second UE in response to the discovery message.

11. The UE of claim 10, further comprising:
collecting measurement data corresponding to a connection between the UE and a currently camped cell, and
wherein determining that the predetermined condition is satisfied includes determining that the measurement data is above a first threshold and below a second threshold.

12. The UE of claim 11, wherein the second UE is outside of a coverage area of the currently camped cell.

13. The UE of claim 11, wherein the measurement data is a single quality value based on measurement data corresponding to multiple beams.

14. The UE of claim 10, wherein the predetermined condition is based on a direction of the UE relative to a currently camped cell.

15. The UE of claim 11, wherein the discovery message includes a service data unit (SDU) type in a packet data convergence protocol (PDCP) header.

16. An integrated circuit, comprising:
circuitry configured to determine that a predetermined condition is satisfied, the predetermined condition associated with a first UE operating as a layer 2 (L2) UE-to-network relay for a second UE and comprising at least one or more access stratum (AS) layer based conditions, wherein the L2 UE-to-network relay comprises a Uu interface between the first UE and a base station and a PC5 interface between the first UE and the second UE;
circuitry configured to transmit a sidelink discovery message, in response to determining that the predetermined condition is satisfied; and
circuitry configured to monitor for a signal from the second UE in response to the discovery message.

17. The integrated circuit of claim 16, further comprising:
circuitry configured to collect measurement data corresponding to a connection between the UE and a currently camped cell, and
wherein determining that the predetermined condition is satisfied includes determining that the measurement data is above a first threshold and below a second threshold.

18. The integrated circuit of claim 17, wherein the measurement data is a single quality value based on measurement data corresponding to multiple beams.

19. The integrated circuit of claim 16, wherein the predetermined condition is based on a synchronization signal block (SSB) index value.

20. The integrated circuit of claim 16, wherein the discovery message includes a service data unit (SDU) type in a packet data convergence protocol (PDCP) header.

* * * * *